United States Patent
Delon et al.

(10) Patent No.: US 9,595,832 B2
(45) Date of Patent: Mar. 14, 2017

(54) CONTROL UNIT FOR AN ELECTRICAL GENERATION/CONSUMPTION SYSTEM

(75) Inventors: Pierre-Etienne Delon, Vaucresson (FR); Olivier Normand, Buc (FR)

(73) Assignee: ELECTRICITE DE FRANCE, Paris (FR)

( * ) Notice: Subject to any disclaimer, the term of this patent is extended or adjusted under 35 U.S.C. 154(b) by 560 days.

(21) Appl. No.: 14/125,079

(22) PCT Filed: Jun. 6, 2012

(86) PCT No.: PCT/EP2012/060742
§ 371 (c)(1),
(2), (4) Date: Mar. 6, 2014

(87) PCT Pub. No.: WO2012/168323
PCT Pub. Date: Dec. 13, 2012

(65) Prior Publication Data
US 2014/0207302 A1    Jul. 24, 2014

(30) Foreign Application Priority Data
Jun. 10, 2011    (FR) .................................. 11 55130

(51) Int. Cl.
*H02J 3/38*    (2006.01)
*H02J 4/00*    (2006.01)
(Continued)

(52) U.S. Cl.
CPC    *H02J 4/00* (2013.01); *H02J 3/28* (2013.01); *H02J 3/381* (2013.01); *H02J 3/008* (2013.01); *Y04S 50/10* (2013.01)

(58) Field of Classification Search
CPC ...... H02J 4/00; H02J 3/28; H02J 3/381; H02J 3/008; Y04S 50/10
See application file for complete search history.

(56) References Cited

U.S. PATENT DOCUMENTS 8,406,937 B2 *    3/2013    Verfuerth ........... H05B 37/0209
                                                              700/296
8,412,654 B2 *    4/2013    Montalvo ................. H02J 3/14
                                                              307/31
(Continued)

FOREIGN PATENT DOCUMENTS

FR    2 904 486 A1    2/2008
JP    2010 193562 A    9/2010

*Primary Examiner* — Robert Fennema
*Assistant Examiner* — Tri T Nguyen
(74) *Attorney, Agent, or Firm* — Blakely Sokoloff Taylor & Zafman LLP

(57)    ABSTRACT

The invention relates to a control unit for an electrical generation/consumption system including generation sources (200) and consumption units (300) connected by a distribution network (100), including a control center (400) which transmits, to controllable consumption units (310) and to controllable generation sources (210), modulation orders based on warning information received from an external operator (500), on information relating to the potential of the respective suppression of units (310), and on information relating to the respective potential of generation or of a decrease in generation of sources (210), or of the suppression of the latter, at each unit (310), a module (312) which transmits, to the center (400), data updated in real time representing the potential modulation suppression of the unit (310), and at the sources (210), a module (212) which transmits, to the control center (400), data which is updated in real time and which is representative of the potential of generation or of the decrease in the generation of the source (210), or of the suppression of the latter.

24 Claims, 4 Drawing Sheets

Figure 1:
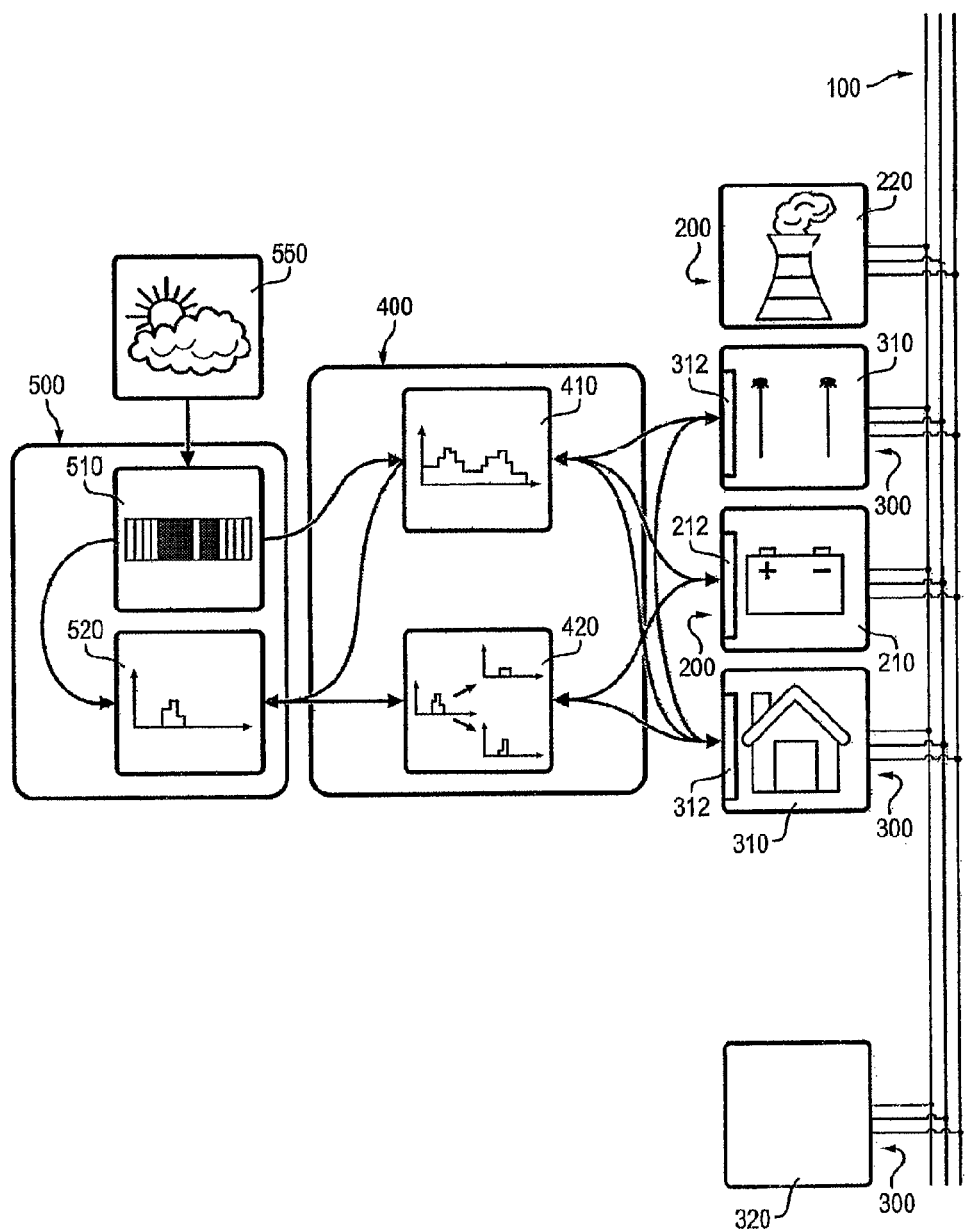

(51) Int. Cl.
*H02J 3/28* (2006.01)
*H02J 3/00* (2006.01)

(56) References Cited

U.S. PATENT DOCUMENTS

| | | | |
|---|---|---|---|
| 9,043,038 B2* | 5/2015 | Kempton | B60L 11/1824 180/65.275 |
| 2008/0040296 A1* | 2/2008 | Bridges | G01D 4/004 705/412 |
| 2009/0200988 A1* | 8/2009 | Bridges | G06Q 50/06 320/137 |

* cited by examiner

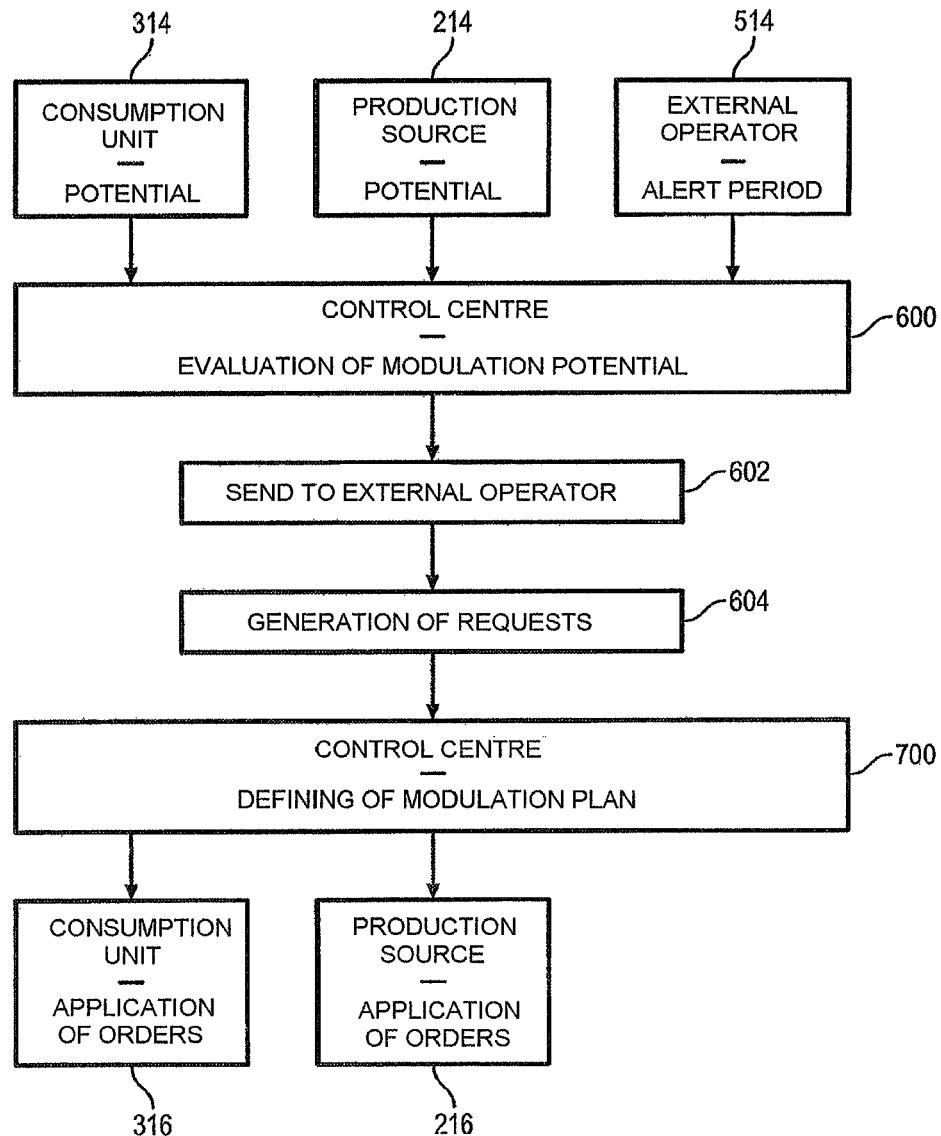

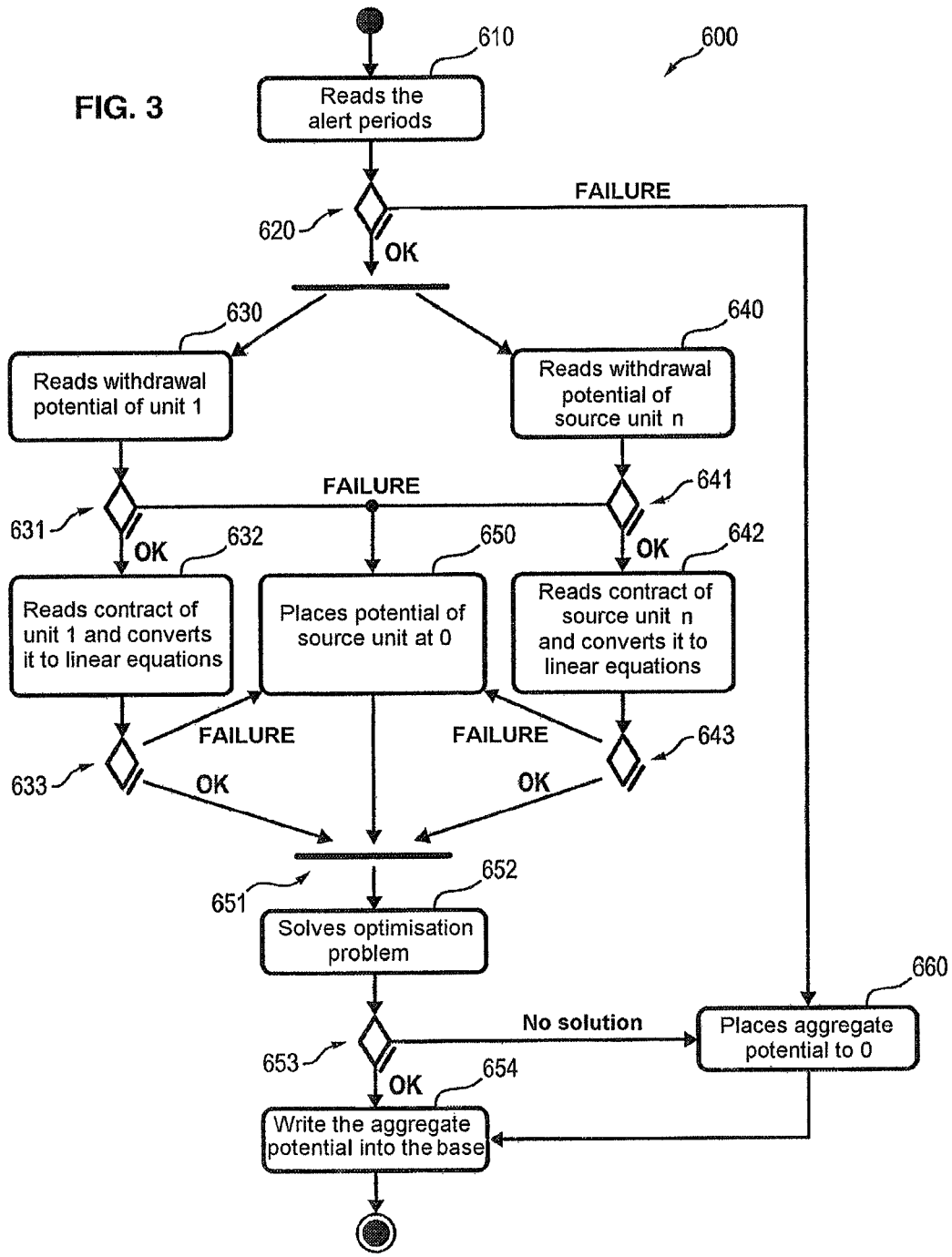

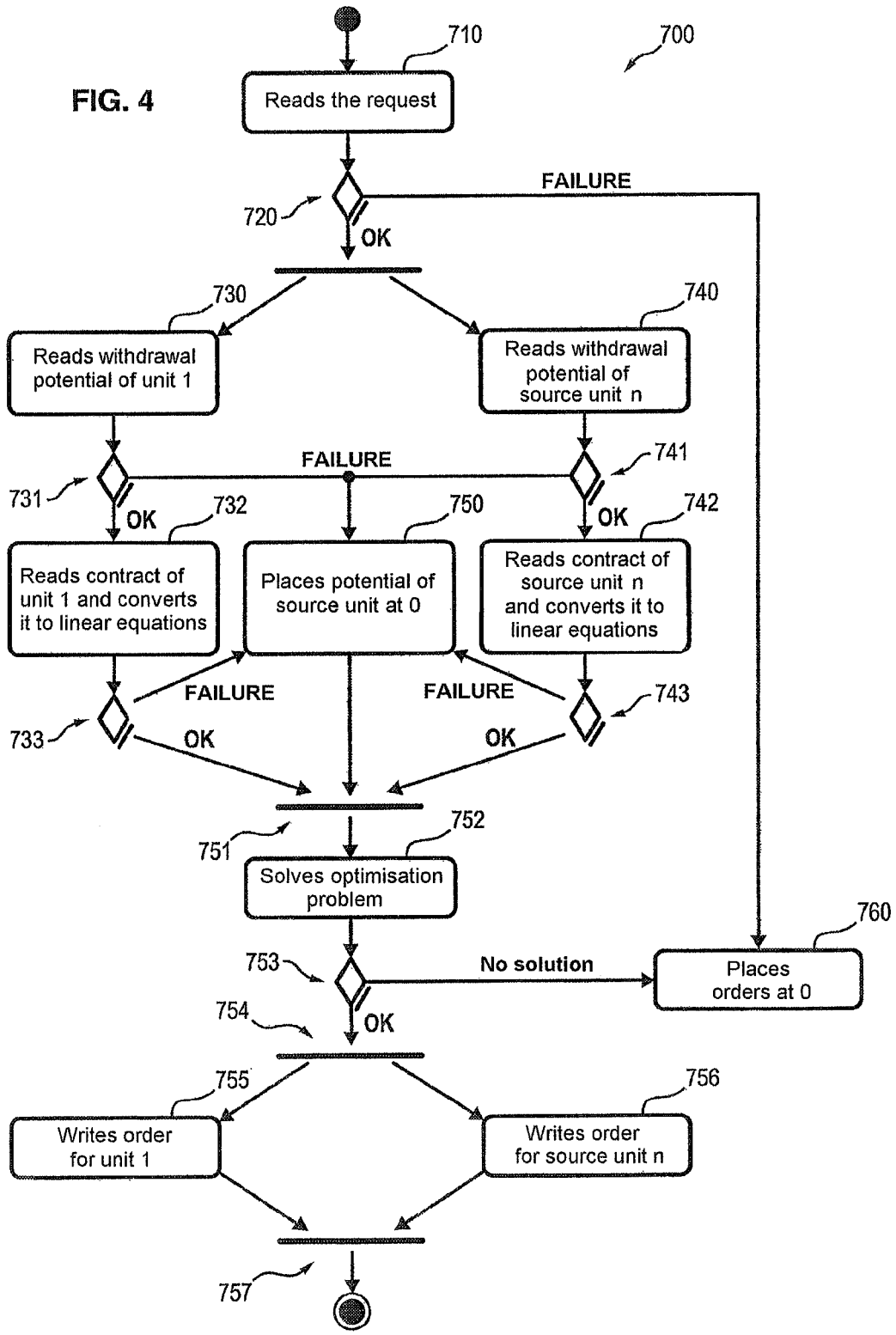

CONTROL UNIT FOR AN ELECTRICAL GENERATION/CONSUMPTION SYSTEM

The present invention relates to the field concerning the management of electricity systems, and in particular electricity distribution networks.

At the current time, the management of electricity systems most often entails the modulation of centralised production to obtain balancing of consumption and production at all times within a network, typically at the national level of a State, on the basis of effective consumption measured in real time.

The idea of modulating the load of an electricity distribution network, and not centralised production, has been entertained for a long time. For example in France, mention can be made of the price rates called Peak Hours/Off-peak hours for the supply to hot water tanks during certain periods of the day. So-called EJP contracts (Effacement des Jours de Pointe)—Peak Day Withdrawal—have also been introduced to prompt customers not to use electricity certain days of the year. With the arrival of Internet and the democratisation of ADSL access (Asymmetry Digital Subscriber Line) solutions have been developed to send peak day withdrawal signals from a centralised server. These solutions target national controlling of a homogeneous portfolio of consumers. For example clients having electric convectors are offered the installation of a box which communicates with a centralised server and on receiving a request from this server the box selectively switches off the supply to one or more convectors. The potential for withdrawal is evaluated statistically by analysing the deformation of the load curve of withdrawal customers.

This approach has several drawbacks:
the determining of customer peak day withdrawal potential is made a posteriori i.e. after a learning time of the aggregate load curve;
so that peak day withdrawal is reliable, the number of withdrawal customers must be high which prevents use of this system on a local scale, and hence on a low voltage distribution network;
the portfolio of peak day withdrawal customers must be globally homogeneous. It typically concerns consumers connected to the electricity network where one same item of equipment has been installed having a single function e.g. electric convectors whose peak day withdrawal is controlled.

Other examples of solutions proposed in the state of the art can be found in documents FR 2 904 486, FR 2 937 473 and US 2010/0094479.

Document FR 2 904 486 describes a method for managing and modulating the electricity consumption of a group of consumers connected to an electricity distribution network, which proposes real-time measurement of the electricity consumption of a plurality of targeted groups of electric equipment in operation, and the transmitting of data thus collected by measuring boxes located at each item of equipment towards a central server and the sending of withdrawal orders by the central server to some of the boxes if an external global instruction so requires.

Document FR 2 937 473 describes a method for regulating the power consumed on an electricity network whereby each eligible consumer communicates the following parameters to a central entity:
the maximum acceptable length of time of a reduction in consumption;
the minimum acceptable time for triggering reduction;
the maximum acceptable value of the reduction of consumed electric power.

Document US 2010/0094479 describes another method for regulating the power consumed on an electricity network. In one embodiment the method described in this document entails the measuring of a voltage or power from an electric socket of the subscriber, and sending data to a central server via an Internet access from the customer's computer.

It is the objective of the present invention to propose novel means with which to overcome the disadvantages of the prior art and to improve on the performance of systems known up until now.

The aforementioned objective is reached according to the present invention by means of an assembly for controlling an electricity production/consumption system comprising electricity production sources and consumption units connected via a distribution network, characterized by the fact that it comprises:
a control centre adapted to transmit modulation orders to controllable consumption units and to controllable electricity production sources corresponding to withdrawal and production orders respectively, based on alert data received from an external operator, on data representing the respective withdrawal potential of controllable consumption units, and on data representing the respective production or reduced production even the withdrawal potential of production sources;
at each controllable consumption unit, a module adapted to transmit data to the control centre that is updated in real time representing the respective withdrawal potential of the associated unit; and
at some at least of the controllable production sources, a module adapted to transmit data to the control centre updated in real time representing the respective production or reduced production even withdrawal of the associated source.

In the present invention, the aforementioned systems of electricity production and/or consumption are to be considered as integrating storage means when applicable. In other words, the present invention encompasses electricity systems in which at least some of the production and/or consumption systems are formed of said storage means.

According to other advantageous characteristics of the invention:
The control centre is adapted to give modulating orders to the controllable production sources and to the controllable consumption units at different time horizons, preferably at two time horizons for example a 24 h horizon at a pitch of 30 min for D−1 modulation requests and a 4 h horizon at a pitch of 10 min for D modulation requests;
Each module is adapted to provide data on its modulation potential i.e. withdrawal or production potential respectively at a time horizon longer than that of the control centre for giving orders;
the modulating potential is described i) by data updated in real time and ii) by operating constraints entered into a withdrawal or production contract;
the data updated in real time comprise data chosen from among maximum adjustable power i.e. which can be withdrawn or produced over a predetermined period for example over the next 40 hours at a pitch of 10 mn, the marginal cost of modulation i.e. of withdrawal or modulated production over a predetermined period, the current state (available or in shortage), and optionally data related to use of the stock for example a default profile of use of the stock, a profile of maximum variation in stock, an initial stock level and a final minimum stock level;

the control centre receives two types of alert periods from the external operator corresponding to different probabilities of requested withdrawal or production.

The present invention also concerns a method for controlling a system for electricity production/consumption comprising electricity production sources and consumption units connected via a distribution network.

Other characteristics, objectives and advantages of the present invention will become apparent on reading the following detailed description with reference to the appended drawings given as a non-limiting example in which:

FIG. 1 gives a schematic view of a control assembly conforming to the present invention;

FIG. 2 schematically illustrates the general flow chart of the control method conforming to the present invention;

FIG. 3 schematically illustrates the steps of a method for determining the aggregate potential of modulation, withdrawal and/or production, conforming to the present invention; and FIG. 4 schematically illustrates the steps of a method for determining the distribution of modulation orders, withdrawal and/or production orders, conforming to the present invention.

The invention concerns a control assembly for an electricity production/consumption system and a method for controlling said system. This system comprises a low voltage electricity distribution network schematically referenced 100 in FIG. 1, electricity production sources 200 and consumption units 300 connected to the network 100.

Among the electricity production sources 200 and the consumption units 300 connected to the network 100 there is provided at least some production sources 210 and some controllable consumption units 310 which are adapted to be controlled by a control centre 400 in accordance with a method conforming to the present invention.

For this purpose, according to the invention, at least at some of the controllable production sources 210 there is provided a module 212 adapted to transmit data to the control centre 400 that is updated in real time representing the modulation potential i.e. the potential of production or reduction in production even the withdrawal of the associated source 210.

Similarly, according to the invention provision is made at each controllable consumption unit 310 for a module 312 adapted to transmit data to the control centre 400 that is updated in real time representing the modulation potential i.e. the respective withdrawal potential of the associated unit.

Other production sources 220 and consumption units 320 can be connected to the network 100 without being controllable by the control centre 400. Such production sources 220 can be controlled for example on the basis of other known processes. Similarly, at least some of the consumption units 320 not controllable by the control centre 400 can be controlled on the basis of known processes e.g. contracts of EJP type.

The control centre 400 is adapted to transmit modulation orders to the controllable consumption units 310 and to the controllable electricity production sources 210 these orders corresponding to instructions of withdrawal or production respectively based on alert data received from at least one external operator 500 (who is to be considered an actor within the electricity system), on data representing the respective withdrawal potential of the controllable consumption units 310, and on data representing the respective potential of production or reduced production even withdrawal of the controllable production sources 210.

The controllable production sources 210 are therefore systems connected to the electricity network 100 which produce electricity, which have modules 212 compatible with the control centre 400 and which are controllable. By <<compatible with the control centre 400>> and <<controllable>> is meant that the modules 212 are adapted to transmit to the control centre 400 a certain amount of data on their withdrawal and/or production potential and to receive data from the control centre allowing the modulation of their power by an expressed quantity (for example in W) in the form of a production plan and preferably at different time horizons.

The controllable consumption units 310 are systems that are connected to the electricity network 100, which consume electricity, which have modules 312 compatible with the control centre 400 and which are controllable. By <<compatible with the control centre 400>> and <<controllable>> is meant that the modules 312 are adapted to transmit to the control centre 400 a certain amount of data on their withdrawal potential and to receive data from the control centre allowing modulation of the their power by an expressed quantity (for example in W) in the form of a reduced consumption plan and preferably at different time horizons.

Appended FIG. 2 schematically illustrates the control method according to the present invention, comprising the following main steps:

Steps 314, 214 and 514 during which the controllable consumption units 310, the production sources 210 and the external operator 500 generate data representing their modulation potential and alert periods;

Step 600 during which the control centre 400 evaluates the modulation potential of all the 10 production sources 210 and consumption units 310;

Step 602 during which the control centre 400 addresses the result of this evaluation to the external operator 500;

Step 604 during which the external operator generates general modulation requests and addresses these requests to the control centre 400;

Step 700 during which the control centre 400 evaluates individual modulation plans; and Steps 316 and 216 during which the consumption units 310 and respectively the production sources 210 apply the modulation orders received from the control centre 400.

The aforementioned different time horizons of the modulation orders given by the control centre 400 at step 700 and implemented by the units 310 and sources 210 at steps 316 and 216, comprise for example at least one first time horizon on a day scale at a first pitch in minutes, for modulation requests sent the day before their application, and a second time horizon on the scale of a few hours at a second pitch in minutes preferably smaller than the first pitch for modulation requests sent on the day of application thereof.

More specifically according to one preferred embodiment of the present invention, the aforementioned different time horizons, by definition for production or reduced consumption plans, comprise two time horizons defined as follows:

24 h at a pitch of 30 minutes for modulation requests of D−1 type i.e. sent the day before application thereof;

4 h at a pitch of 10 minutes for modulation requests of D type i.e. sent on the day of their application.

The power modulation requests sent by the control centre 400 to a controllable production source 210 or to a controllable consumption unit 310, after step 700, are called modulation orders. A distinction is therefore made between D−1 modulation orders and D modulation orders. If a controllable production source 210 or controllable consumption unit 310 receives two overlapping orders, it preferably applies the order resulting from the sum of both. In this sense the instructions are incremental.

However, as a variant, it is possible to make provision so that several external operators take part in the present invention. In this case provision can be not to apply an incremental order resulting from the sum of the received orders, but to apply an order resulting from predefined arbitration in accordance with the type of external operator sending the alert period.

At steps 214 and 314 each controllable production source 210 or controllable consumption unit 310 provides data in real time e.g. every hour on its modulation potential i.e. its withdrawal or production potential respectively over a future estimated period of time. Preferably this estimated period of time corresponds to a time horizon longer than that chosen by the control centre 400 for giving its orders. As a preferred but non-limiting example, each controllable production source 210 or controllable consumption unit 310 therefore provides data in real time at steps 214 and 314 on its withdrawal respectively production potential over the next 40 hours at a pitch of 10 minutes. The time pitch e.g. of 10 minutes of the data provided by the sources 210 and units 310 is preferably equal to the minimum pitch of the orders generated by the control centre 400 at step 700.

The modulation potential i.e. the withdrawal respectively the production potential transmitted by the sources 210 and units 310 to the control centre 400 at steps 214 and 314 is preferably described by data updated in real time and by operating constraints.

The data updated in real time may comprise:
the maximum adjustable power i.e. which can be withdrawn or produced, at a pitch of 10 minutes over the next 40 hours;
the marginal modulation cost i.e. of withdrawal or over-production, at a pitch of 10 minutes over the next 40 hours i.e. the total cost resulting from the impact of modulation on all the items of equipment contained in a unit 310;
its current state i.e. available or in shortage.

Optionally the data updated in real time may also comprise data related to the use of a stock allowing the displacement of consumption or production from a source 210 or unit 310 over time for example:
A default profile of use of its stock at a pitch of 10 minutes over the next 40 hours.
A profile of maximum variation in its stock at a pitch of 10 minutes over the next 40 hours i.e. in particular the capability to reconstitute its stock before or after a request for modulation of its power.
An initial stock level.
A final minimum stock level.

The operating constraints preferably comprise the technical constraints of the sources 210 and units 310 and user comfort restraints of each unit 310 as well as formally described financial clauses i.e. preferably mathematically in a withdrawal contract or production contract.

The control centre 400 at step 514 receives alert periods from module 510 of an external operator 500 these being orange and red alert periods at a pitch of 30 minutes for example, indicating the periods during which it is likely to receive a modulation request comparable to a request for load reduction. In reality in the present invention a said request for reduced load may comprise either a request to withdraw consumption for the consumption units 310 or a request for over-production of its sources 210. The module 510 of the external operator 500 may take parameters into account originating for example from a weather forecast model 550.

Preferably the pitch (30 minutes) of the alert periods is equal to the pitch of the longest horizon of the orders.

An orange alert signals a period with a moderate probability of a request being sent whilst a red alert corresponds to a strong probability of such request. The alerts are sent to the control centre 400 by the external operator 500 at step 514 the day before their application, preferably before 16 h.

A more detailed description is given below in connection with FIG. 3 of an example of the evaluation of an aggregate modulation potential made by the control centre at step 600 and sent to the external operator at step 602.

As a result, a modulation request corresponding to a request for reduced load transmitted by a module 520 of the external operator 500 to the control centre 400 at step 604 is called a modulation request. As for the modulation orders, a distinction is made between D−1 modulation requests and D modulation requests.

The control centre 400 at every hour at step 600 computes the modulation potential i.e. the potential for reduced load of all the consumption units 310 and the production potential of the production units 210. For this purpose, the control centre 400 evaluates a maximisation of individual potentials in priority on the red alert periods, then on the orange alert periods taking into account the constraints laid down in the withdrawal or production contracts. The control centre 400 performs this maximisation of individual potentials, similar to the solving of a linear programming problem in integers, by means of conventional computing means. The control centre 400 also computes the aggregate marginal modulation cost, for withdrawal or production, of the sources 210 and units 310. This potential (quantity and marginal cost) is called the aggregate modulation potential. The control centre 400 communicates the modulation potential, withdrawal or production, to the external operator 500 every hour at step 602.

The external operator 500 sends a modulation request, withdrawal or production, to the control centre 400 at step 604 as a function of its own needs. The request is divided by the control centre 400 at step 700 into withdrawal or production modulation orders over all available source 210 and units 310 so as to minimise the cost of modulation, withdrawal or production, whilst paying heed to the constraints set down in the withdrawal or production contacts. Here again the control centre 400 performs this minimisation of individual modulation, similar to the solving of a linear programming problems in integers, by means of conventional computing means.

A request transmitted by the external operator 500 at step 604 is a set of modulation orders, generally for withdrawal, to be applied over given time periods. For example, the external operator 500 may request the withdrawal of 5 MW from 08 h00 to 08 h30, and of 3 MW from 08 h30 to 9 h00.

A request transmitted by the external operator 500 is defined by:
a time pitch length (e.g. 30 minutes);
a request duration expressed in number of time pitches;
a date of start of the request;
a list of positive or zero values (the list has a size equal to or lower than the number of time pitches).

If at a time t the request has no value, then the request is free. Free requests correspond to white alert periods.

Preferably the number, the time horizons and pitches of the modulation requests generated by the external operator 500 are identical to those of the modulation orders given by the control centre 400.

Therefore, preferably, there are two types of requests:

D−1 requests which are applied the following day starting at 00 h00, have a time pitch of 30 minutes and last 24 h (i.e. 48 time pitches);

D requests which are applied the same day, have a time pitch of 10 minutes and last a maximum time of 4 h (i.e. 24 time pitches).

The withdrawal potential is computed by a dedicated module of the control centre 400 at step 600 by maximising the individual potentials in priority on the red alert periods then on the orange alert periods. For the consumption units 310 even the production units 210 which have a stock, the white alert periods are used as periods in which overconsumption is authorised to reconstitute the stock before or after a withdrawal period. This amounts to saying that for these units 310 the withdrawal order is free over the white alert periods.

The function of the objective of the optimisation problem is the following:

$$\max \sum_{i \in T} \sum_{p \in P} f(a_t) \cdot c_t(p)$$

where f:

$$\begin{cases} N \mapsto R^+ \\ a \mapsto f(a) \end{cases}$$

is an increasing function which translates the valuing of the withdrawal or production modulation as a function of the alert period (0=white alert, 1=orange alert and 2=red alert) and $c_t(p)$ is the withdrawal or production modulation order of a unit 310 or source 210 $p$ at time t.

A module of the control centre 400 dedicated to the determining of the distribution of modulation, which operates at step 600, is based on a similar function.

The withdrawal or production contract can be the subject of different modalities.

It is preferably divided into two parts:

A first part of this contract describes the modulation cost i.e. the cost of withdrawal or production of a unit 310 or source 210 $p$ at time t denoted $\pi_t(p)$. This cost is composed of a call cost $\pi_t^m(p)$, of a minimum modulation cost (withdrawal) $\pi_t^{min}(p)$ and of a marginal modulation cost (withdrawal) cost $\pi_t^{mar}(p)$:

$$\pi t(p) = \pi_t^m(p) \cdot m_t(p) + \pi_t^{min}(p) \cdot Z_t(p) + \pi_t^{mar}(p) \cdot c_t(p)$$

where $m_t(p) \in \{0,1\}$ indicates the changeover from a zero order to a nonzero order;

$Zt(p) \in \{0,1\}$ indicates whether the order is nonzero and $c_t(p)$ represents the order given to a unit 310 or source 210 $p$ at a time t.

The second part of a contract translates a list of technical or comfort constraints e.g.

Maximum gradient between two consecutive moments.

Minimum strictly positive modulation time (for withdrawal).

Maximum strictly positive modulation time (for withdrawal).

Minimum time between two strictly positive modulations (withdrawals).

Maximum number of requests.

Maximum amount of modulation (withdrawal).

Management of a stock: this constraint is applied to the variables $c_t(p)$(order), $s_t(p)$ (stock level) and $d_t(p)$ (degradation of comfort). Let $(G_t^{S,def}(p))$ (default variation in stock), $(-G_t^{S,max}(p))$ (maximum possible variation in stock) and $(D_t^{max}(p))$ (maximum degradation of comfort expressed in energy) be three real vectors:

$$\forall t_i \in \tau \setminus \{t_0\}, \begin{cases} t_i \in \overline{T} \Rightarrow S_{ti}(p) - S_{ti-1}(p) \leq G_{ti-1}^{S,max}(p) \\ t_i \notin \overline{T} \Rightarrow S_{ti}(p) - S_{ti-1}(p) + C_{ti-1}(p) - d_{ti-1}(p) = G_{ti-1}^{S,def}(p) \end{cases}$$

$$d_{tu}(p) - D_t^{max}(p) \leq 0$$

where $\overline{T}$ represents the white alert periods i.e. the times when the orders are free.

A description will now be given of the method for determining the aggregate withdrawal potential illustrated as a non-limiting example in FIG. 3 and implemented by means of the module referenced 410 in FIG. 1.

This method comprises the following steps:

Step 610: reading by the control centre 400 of the alert periods transmitted by the external operator 500;

Step 620; test step followed in the event of failure by a step 660 which forces the aggregate potential to 0;

Step 630: reading by the control centre 400 of the modulation potential of a source 210 or of a unit 310;

Step 631: test step followed in the event of failure by a step 650 which forces the potential of the source 210 or of the unit 310 under consideration to 0;

Repeat of steps 630 and 631 for all the sources 210 and units 310, such as illustrated by the steps referenced 640 and 641;

Step 632: reading by the control centre 400 of the contract of a source 210 or of a unit 310 and transforming of this contract into linear equations;

Step 633: test step followed in the event of failure by the above-mentioned step 650;

Repeat of steps 632 and 633 for all the sources 210 and units 310, such as illustrated by the steps referenced 642 and 643;

Intermediate step 651 following after steps 633, 643 and 650;

Step 652 during which the control centre 400 solves the problem of optimising the aggregate modulation potential;

Step 653: test step followed in the event of filature i.e. when the control centre 400 does not find any solution, by aforementioned step 660; then Consecutively after steps 653 and 660, step 654 to write the aggregate potential before sending to the external operator at step referenced 602 in FIG. 3.

The method for determining the distribution of the modulation orders, illustrated as a non-limiting example in FIG. 4 and implemented by the module referenced 420 in FIG. 1, comprises the following steps:

Step 710: reading by the control centre 400 of the requests transmitted by the external operator 500;

Step 720: test step followed in the event of failure by a step 760 which forces the order to 0;

Step 730: reading by the control centre 400 of the modulation potential of a source 210 or of a unit 310;

Step 731: test step followed in the event of failure by a step 750 which forces the order of the source 210 or of the unit 310 under consideration to 0;

Repeat of steps 730 and 731 for all the sources 210 and units 310, such as illustrated by the steps referenced 740 and 741;

Step 732: reading by the control centre 400 of the contract of a source 210 or of a unit 310 and transforming of this contract into linear equations;

Step 733: test step followed in the event of failure by the aforementioned step 750;

Repeat of steps 732 and 733 for all the sources 210 and units 310, such as illustrated by the steps referenced 742 and 743;

Intermediate step 751 following after steps 733, 743 and 750;

Step 752 during which the control centre 400 solves the problem of optimising individual modulations;

Step 753: test step followed in the event of failure i.e. when the control centre 400 does not find any solution, by the aforementioned step 760;

Intermediate step 754 followed by:

Step 755 to write the order for a first unit 310 then a repeat of this step in the form of step 756 for each of the units 310 and sources 210;

Final step 757 to collect all the orders before they are sent to the controllable consumption units 310 and controllable production sources 210, at steps referenced 216 and 316 in FIG. 4.

Persons skilled in the art will appreciate on reading the foregoing detailed description that the present invention leads to much higher performance levels than those of the means proposed up until now to control an electricity distribution network.

In particular, the genericity of the modelling not only of consumption units 310 but also of production sources 210 included in the method implemented by the control centre 400, allows the optimal controlling of consumption units 310 and production sources 210 of completely different type whether for production, shedding, storing or substitution of electricity consumption by another source of energy. The following list illustrates this heterogeneity of means able to be connected to the distribution network 100 and to be controlled according to the present invention, this list not being exhaustive:

public lighting;
heat pump coupled to a hot water tank;
electricity load shedder;
a battery optionally coupled to photovoltaic panels or micro wind turbine
thermodynamic power plant;
air conditioning with cold storage system;
small hydraulic plant with tank (pico-hydraulic);
dual-energy wood-electricity heating system.

In addition, the computing of the aggregate withdrawal potential of the consumption units 310 and production sources 210 by the control centre 400 conforming to the present invention amounts to a break with the state of the art. As seen by an external operator 500 the control centre 400 can be compared to a virtual plant which (depending on its capacity i.e. the number of its units 310 or sources 210) is capable of providing a modulation capability in particular for consumption withdrawal and to take part in the operation of the electricity network 100 in the same way as a conventional power plant. The control centre 400 conforming to the present invention, with a sufficient number of units 310 and sources 210, is compatible with the spot market for electricity and with the infra-daily adjustment mechanism.

In addition, the economical optimisation of the distribution of withdrawal requests formulated by an external operator 500 into orders sent to the units 310 and sources 210 guarantees the providing of the exact withdrawal requested by the external operator whilst minimising the cost thereof.

It is to be stressed that in the methods currently used in the state of the art, consumption is considered to be a perturbing random variable and not as a controllable element to balance the system. Also according to the state of the art, decentralised production is not controlled to balance the system; it is considered to be fatal.

The invention proposes a major breakthrough in the field of controlling electricity load: by using a modelling approach rather than a statistical learning approach it allows consumption and decentralised production to be made controllable in a low voltage distribution network i.e. at local territory level. By grouping together a sufficient number of consumers and small producers (typically between 1000 and 10000) the present invention allows the controlling of non-negligible power (from 1 to 100 MW) and thereby contributes towards the equilibrium of the electricity system.

The taking into consideration of the modelled modulation potential of the controllable production sources, made variable by the present invention, also allows the minimising of withdrawal orders and the imposed withdrawal periods are shorter than those resulting from the means known in the state of the art.

The data exchanged between the external operator(s) 500, the production sources 210, the consumption units 310 and the control centre 400 can be transmitted between these different elements by any suitable means e.g. by carrier currents (CPL) on the network 100, or by dedicated separate channels e.g. by wire or optical fibre, even by any suitable wireless communication means. In other words, the present invention is in no way limited with respect to the physical transmission medium (CPL, radio, ADSL, . . . ), or to the channel or architecture of communication between the consumption units or production sources, the control centre and the operators. For example, the data may transit via the meter of installations or via independent boxes in particular internet boxes, without passing through the meter.

Evidently the present invention is not limited to the particular embodiment just described but encompasses any variant conforming to the spirit thereof.

The invention claimed is:

1. A control assembly for controlling an electricity production/consumption system comprising electricity production sources and consumption sources connected via a distribution network, characterized by the fact that it comprises:

a control centre adapted to transmit modulation orders to controllable consumption units and to controllable electricity production sources, these orders corresponding to withdrawal or production orders respectively, based on alert data received from an external operator, on data representing the respective withdrawal potential of controllable consumption units and on data representing the respective production, reduced production, or withdrawal potential of production sources;

at each controllable consumption unit, a module adapted to transmit data to the control centre updated in real time representing the respective withdrawal potential of the associated unit; and at least at some controllable production sources, a module adapted to transmit data to the control centre updated in real time representing the respective production, reduced production or withdrawal of the associated source, wherein the control centre is adapted to give modulation orders to the controllable production sources and to the controllable consumption units at least as per a first time horizon on a day scale at a first pitch in minutes, for modulation orders sent the next day before the application thereof, and a second time horizon on the scale of a few hours at a second pitch in minutes, smaller than the first pitch, for modulation orders sent on the day of the application thereof.

2. The control assembly according to claim 1, characterized in that the control centre is adapted to give modulation orders to the controllable production sources and to the controllable consumption units at different time horizons.

3. The control assembly according to claim 1, characterized in that the control centre is adapted to give modulation orders to the controllable production sources and to the controllable consumption units as per two time horizons, one 24 hour time horizon at a pitch of 30 minutes for D−1 modulation requests, and a 4 hour time horizon at a pitch of 10 minutes for D modulation requests.

4. The control assembly according to claim 1 characterized in that a controllable production source or a controllable consumption unit which receives two overlapping orders applies an incremental order resulting from the sum of both or else an order resulting from a predefined arbitration in accordance with the type of external operator sending the alert period.

5. The control assembly according to claim 1, characterized in that each module is adapted to provide data on its withdrawal or production potential respectively at a time horizon longer than that of the control centre for orders given.

6. The control assembly according to claim 1, characterized in that each module provides data on its modulation potential in real time, for the next 40 hours at a pitch of 10 minutes.

7. The control assembly according to claim 1, characterized in that the time pitch for data provided by the modules is equal to the minimum pitch of the orders generated by the control centre.

8. The control assembly according to claim 1, characterized in that the modulation potential generated by the modules is described i) by data updated in real time and ii) by operating constraints entered into a withdrawal or production contract.

9. The control assembly according to claim 8, characterized in that the data updated in real time comprise data chosen from among maximum adjustable power, which can be withdrawn or produced over a predetermined period, the marginal cost of modulation and the current state.

10. The control assembly according to claim 8, characterized in that the data updated in real time comprise data related to use of a stock, including at least one of a profile of default use of the stock, a profile of maximum variation in the stock, an initial stock level and a final minimum stock level.

11. The control assembly according to claim 8, characterized in that the operating constraints comprise technical constraints of the controllable production sources and controllable consumption units and comfort restraints of the user of each unit as well as financial clauses entered into a withdrawal contract, even a production contract.

12. The control assembly according to claim 1, characterized in that the control centre receives two types of alert periods from the external operator corresponding to different probabilities of requests for withdrawal or production.

13. The control assembly according to claim 1 characterized in that the pitch of alert periods is equal to the pitch of the longest horizon of the orders.

14. The control assembly according to claim 1, characterized in that the alerts are sent to the control station by the external operator the day before the application thereof.

15. The control assembly according to claim 1, characterized in that the number, time horizons and pitches of modulation requests generated by the external operator are identical to those of the modulation orders given by the control centre.

16. A method for controlling an electricity production/consumption system comprising electricity production sources and consumption units connected via an electricity distribution network, characterized in that it comprises the steps of:
generating data representing a modulation potential at the controllable consumption units and controllable production sources and generating alert periods at an external operator;
evaluating a modulation potential for all the controllable production sources and controllable consumption units at a control centre on the basis of the aforementioned data;
addressing the result of this evaluation to the external operator;
generating general modulation requests at the external operator and addressing these requests to the control centre;
evaluating individual modulation plans at the control centre on the basis of requests given by the external operator and data received from the controllable production sources and controllable consumption units; and
applying the resulting modulation orders received from the control station to the controllable production sources and controllable consumption units,
wherein the control centre initially maximizes individual modulation potentials over priority alert periods, then over alert periods of secondary priority, taking into account the constraints entered into withdrawal or production contracts.

17. The method according to claim 16, characterized in that the control centre also calculates the aggregate marginal modulation cost of the controllable production sources and controllable consumption units.

18. The method according to claim 16, characterized in that the control centre takes into account the stocks of the consumption units and production sources.

19. A method for controlling an electricity production/consumption system comprising electricity production sources and consumption units connected via an electricity distribution network, comprising:
generating data representing a modulation potential at the controllable consumption units and controllable production sources and generating alert periods at an external operator;
evaluating a modulation potential for all the controllable production sources and controllable consumption units at a control centre on the basis of the aforementioned data;
addressing the result of this evaluation to the external operator;
generating general modulation requests at the external operator and addressing these requests to the control centre;
evaluating individual modulation plans at the control centre on the basis of requests given by the external operator and data received from the controllable production sources and controllable consumption units; and applying the resulting modulation orders received from the control station controllable production sources and controllable consumption units, wherein the control centre gives modulation orders to the controllable product sources and to the controllable consumption units at least as per a first time horizon on a day scale at a first pitch in minutes, for modulation orders sent the day before the application thereof, and a second time horizon on the scale of a few hours at a second pitch in minutes, smaller than the first pitch, for modulation orders sent on the day of the application thereof.

20. A control assembly for controlling an electricity production/consumption system comprising electricity production sources and consumption sources connected via a distribution network, comprising:

a control centre adapted to transmit modulation orders to controllable consumption units to controllable electricity production sources, said orders corresponding to withdrawal or production orders respectively, based on alert data received from representing controllable an external operator, on data the respective withdrawal potential of consumption units and on data representing the respective production, reduced production, or withdrawal potential of production sources;

at each controllable consumption unit, a module adapted to transmit data to the control centre updated in real time representing the respective withdrawal potential of the associated unit; and at least at some controllable production sources, a module adapted to transmit data to the control centre updated in real time representing the respective production, reduced production, or withdrawal of the associated source, wherein the control centre is adapted to give modulation orders to the controllable production sources and to the controllable consumption units as per two time horizons, one 24 hour time horizon at a pitch of 30 minutes for D−1 modulation requests, and a 4 hour time horizon at a pitch of 10 minutes for D modulation requests.

21. A control assembly for controlling an electricity production/consumption system comprising electricity production sources and consumption sources connected via a distribution network, comprising:

a control centre adapted to transmit modulation orders to controllable consumption units and to controllable electricity production sources, said orders corresponding to withdrawal or production orders respectively, based on alert data received from an external operator, on data representing the respective withdrawal potential of controllable consumption units and on data representing the production sources;

respective production withdrawal potential of or reduced production at each controllable consumption unit, a module adapted to transmit data to the control centre (400) updated in real time representing the respective withdrawal potential of the associated unit; and at least at some controllable production sources, a module adapted to transmit data to the control centre updated in real time representing the production or withdrawal of the associated source, wherein a controllable production source or a controllable consumption unit which receives two overlapping orders applies an incremental order resulting from the sum of both or else an order resulting from a predefined arbitration in accordance with the type of external operator sending the alert period.

22. A control assembly for controlling an electricity production/consumption system comprising electricity production sources and consumption sources connected via a distribution network, comprising:

a control centre adapted to transmit modulation orders to controllable consumption units and to controllable electricity production sources, said orders corresponding to withdrawal or production orders respectively, based on alert data received from an external operator, on data representing the respective withdrawal potential of controllable consumption units and on data representing the respective production, reduced production or withdrawal potential of production sources;

at each controllable consumption unit, a module adapted to transmit data to the control centre updated in real time representing the respective withdrawal potential of the associated unit; and at least at some controllable production sources, a module adapted to transmit data to the control centre updated in real time representing the respective production or reduced production even withdrawal of the associated source, wherein each module provides data on its modulation potential in real time, for the next 40 hours at a pitch of 10 minutes.

23. A control assembly for controlling an electricity production/consumption system comprising electricity production sources and consumption sources connected via a distribution network, comprising:

a control centre adapted to transmit modulation and orders to controllable consumption units to controllable electricity production sources, said orders corresponding to withdrawal or production orders respectively, based on alert data received from an external operator, on data representing the respective withdrawal potential of controllable consumption units and on data representing the respective production, reduced production, or withdrawal potential of production sources;

at each controllable consumption unit, a module adapted to transmit data to the control centre updated in real time representing the respective withdrawal potential of the associated unit; and at least at some controllable production sources, a module adapted to transmit data to the control centre updated in real time representing the production, respective production, or withdrawal of the associated reduced source, wherein the time pitch for data provided by the modules is equal to the minimum pitch of the orders generated by the control station.

24. A control assembly for controlling an electricity production/consumption system comprising electricity production sources and consumption sources connected via a distribution network, comprising:

a control centre adapted to transmit modulation orders to controllable consumption units and to controllable electricity production sources, said orders corresponding to withdrawal or production orders respectively, based on alert data received from an external operator, on data representing the respective withdrawal potential of controllable consumption units and on data representing the respective production, reduced production or withdrawal potential of production sources;

at each controllable consumption unit, a module adapted to transmit data to the control centre updated in real time representing the respective withdrawal potential of the associated unit; and at least at some controllable production sources, a module adapted to transmit data to the control centre updated in real time representing the respective production, reduced production, or withdrawal of the associated source, wherein the pitch of the alert periods is equal to the pitch of the longest horizon of the orders.

* * * * *